United States Patent [19]

Scarpati et al.

[11] Patent Number: 4,980,385
[45] Date of Patent: Dec. 25, 1990

[54] POLYURETHANE/POLYCARBONATE COMPATIBILITY

[75] Inventors: Michael Scarpati, Woodhaven; Mark J. Hughes, Trenton, both of Mich.

[73] Assignee: BASF Corporation, Parsippany, N.J.

[21] Appl. No.: 355,154

[22] Filed: May 22, 1989

[51] Int. Cl.$^5$ .............................................. C08G 18/14
[52] U.S. Cl. ...................... 521/99; 521/117; 521/118; 521/129; 521/155; 524/700; 528/44; 528/49; 528/85
[58] Field of Search .............. 521/99, 117, 118, 129, 521/155; 524/700; 528/44, 49, 85; 428/412

[56] References Cited

U.S. PATENT DOCUMENTS

| | | | |
|---|---|---|---|
| 2,995,530 | 8/1961 | Frisch et al. | 260/2.5 |
| 4,101,462 | 7/1978 | Cuscurida et al. | 521/115 |
| 4,430,455 | 2/1984 | Raden et al. | 521/118 |
| 4,510,269 | 4/1985 | Kopp et al. | 521/166 |
| 4,701,473 | 10/1987 | Masazumi et al. | 521/118 |
| 4,714,719 | 12/1987 | Yamasaki et al. | 521/163 |
| 4,761,307 | 8/1988 | Haas et al. | 427/243 |

FOREIGN PATENT DOCUMENTS

| | | |
|---|---|---|
| 0300349 | 1/1989 | European Pat. Off. . |
| 0300366 | 1/1989 | European Pat. Off. . |
| 1091604 | 11/1967 | United Kingdom . |
| 1338275 | 11/1973 | United Kingdom . |

*Primary Examiner*—Maurice J. Welsh
*Attorney, Agent, or Firm*—William G. Conger; Martin P. Connaughton

[57] ABSTRACT

A molded flexible polyurethane composition having improved polycarbonate compatibility comprising an organic polyisocyanate, a polyol and reactive tertiary amine catalyst. This catalyst contains at least one active hydrogen and/or hydroxyl group in its structure. Another embodiment of this invention relates to a molded flexible polyurethane composition having improved polycarbonate compatibility comprising an organic polyisocyanate, a polyol, a non-reactive tertiary amine catalyst and, an amine scavenger composition which may or may not also contain reactive tertiary amine catalysts. Also disclosed are processes for making said molded flexible polyurethane compositions having improved polycarbonate compatibility.

15 Claims, No Drawings ns
POLYURETHANE/POLYCARBONATE COMPATIBILITY

BACKGROUND OF THE INVENTION

Many molded flexible polyurethane articles contain a structural support attached to or incorporated into them in their finished form. These structural supports are commonly referred to as inserts. These inserts are used, for example, as latches, hinges, and the like used to assemble polyurethane articles for their end use. Common examples of the composition of these inserts are Acrylonitrilebutadiene styrene (ABS), polycarbonate (PC), and ABS/PC alloys and the like. The problem with using polycarbonate inserts with molded flexible polyurethane articles is that in some cases the vapors given off by the polyurethane foam have been found to attack and degrade the polycarbonate causing early failure of the finished end use article.

It has been found that the chemicals in flexible polyunethane foam formulation that were causing the polycarbonate degradation are the tertiary amine catalysts. While the use of tertiary amine catalysts to produce the molded flexible polyurethane is preferred, a system which will not attack and degrade the polycarbonate inserts is needed.

SUMMARY OF INVENTION

The present invention relates to molded flexible polyurethane compositions having an improved polycarbonate compatibility. Polycarbonate compatible molded flexible polyurethane foams are prepared by reacting an organic polyisocyanate with a polyol in the presence of a reactive tertiary amine catalyst. The improvement for producing this improved polycarbonate compatibility comprises employing a catalyst composition comprising only reactive amine catalysts that become part of the polyurethane network.

In another embodiment of the invention molded flexible polyurethane compositions having an improved polycarbonate compatibility are prepared by reacting an organic polyisocyanate with a polyol in the presence of tertiary amine catalysts and amine scavengers, such as phosphate esters.

The use of such catalyst compositions according to the invention for the manufacture of polycarbonate compatible molded flexible polyurethane articles provide the advantage of greatly reducing or eliminating the degradation of the polycarbonate caused by use with said polyurethane articles while retaining the necessary advantageous characteristics of such polyurethane foams for this desired use.

BRIEF DESCRIPTION OF THE INVENTION

This invention may be briefly described as being a molded flexible polyurethane composition having an improved polycarbonate compatibility which comprises an organic polyisocyanate, a polyol, and a reactive tertiary amine catalyst containing at least one active hydrogen and/or hydroxyl group in its structure. It also encompasses a molded flexible polyurethane composition having an improved polycarbonate compatibility which comprises a reacting an organic polyisocyanate, a polyol, a non-reactive tertiary amine catalyst, and an effective amount of a composition which acts as an amine scavenger. The invention also encompasses a process for producing a molded flexible polyurethane composition having an improved polycarbonate insert compatibility which comprises reacting an isocyanate and a polyol in the presence of a reactive tertiary amine catalyst containing at least one active hydrogen and/or hydroxyl group in its structure within a mold or in the alternative reacting an isocyanate and a polyol in the presence of a non-reactive tertiary amine catalyst and a composition which acts as an amine scavenger in a mold and thereby producing said polycarbonate compatibility and proved molded flexible polyurethane composition.

DETAILED DESCRIPTION OF THE INVENTION

The amine catalysts of this invention comprise reactive tertiary amine catalysts. As used herein reactive tertiary amine catalysts are those tertiary amines containing at least one active hydrogen and/or hydroxyl group in its structure. Preferred, are linear tertiary amines containing at least one active hydrogen and/or hydroxyl group in its structure. Said catalysts being generally used in amounts of from about 0.1 weight percent to about 2.8 weight percent, preferably from about 0.3 weight percent to about 1.3 weight percent of the total composition. Examples suitable reactive tertiary amine catalysts include, for example, $(CH_3)_2N(CH_2)_3NH_2$ and $(CH_3)_2NCH_2CH_2OH$. These cataylsts are available commercially from supplies such as Texaco Chemical Co., Air Products and Chemicals, Inc. and others well know in the art.

In another embodiment of the invention fugitive tertiary amine catalysts may be used, alone or in combination with reactive tertiary, in conjunction with amine scavengers, such as, for example, phosphate esters. Suitable phosphate esters include, for example, trischloroethylphosphate, tricresylphosphate, ammonium phosphate and ammonium polyphosphate. These amine scavengers are used in amounts which effectively tie up the unreacted non-reactive amine catalysts. These amine scavengers are generally used in an effective amount to provide the desired effect and range from about a 2:1 ratio to about a 10:1 ratio with said non-reactive tertiary amine catalysts. These phosphate esters are well known and available commercially from companies such as Akzo Chemie America.

The polyisocyanates useful as starting components for the production of such resins using the novel catalyst system according to the present invention may be any aliphatic, cycloaliphatic, araliphatic, aromatic or heterocyclic polyisocyanates, such as those described, for example, by W. Siefken in Justus Liebigs Annalen der Chemie, 562, pages 75 to 136. These include, for example, ethylene diisocyanate; tetramethylene-1,4-diisocyanate; hexamethylene-1,6-diisocyanate; dodecane-1,2-diisocyanate; cyclobutane-1,3diisocyanate; cyclohexane-1,3- and 1,4diisocyanate and mixtures of these isomers; 1-isocyanato-3,3,5-trimethyl-5ioscyanatomethylcyclohexane (U.S. Pat. No. 3,401,190); hexahydrotolylene-2,4- and -2,6-diisocyanate and mixtures of these isomers; hexahydrophenylene-1,3- and/or 4,4,diisocyanate; phenylene-1,3- and -1,4-diisocyanate; tolylene-2,4- and -2,6-diisocyanate and mixtures, of these isomers; diphenylmethane-2,4- and/or 4,4 -diisocyanate; naphthylene-1,5-diisocyanate; triphenylmethane-4,4 ,4 triisocyanate; polyphenyl-polymethylene polyisocyanate which may be obtained by aniline/formaldehyde condensation followed by phosgenation and which have been described, for example, in British Pat.

Nos. 874,430 and 848,671; m- and p-isocyanato-phenyl-sulphonylisocyanates according to U.S. Pat. No. 3,454,606; perchlorinated aryl polyisocyanates as described, e.g. in U.S. Pat. No. 3,277,138; polyisocyanates containing carbodiimide groups as described in U.S. Pat. No. 3,152,162; the diisocyanates described in U.S. Pat. No.3,492,330; polyisocyanates containing allophanate groups as described, e.g.: in British Pat. No. 994,890, Belgian Pat. No. 761,626 and published Dutch Patent Application 7,102,524; polyisocyanates containing isocyanurate groups as described, e.g. in U.S. Pat. No. 3,001,973, in German Pat. Nos. 1,022,789; 1,222,067 and 1,027,394 and in German Offenlegungsschriften Nos. 1,929,034 and 2,004, 048; polyisocyanates containing urethane groups as described, e.g. in Belgian Pat. No. 752,261 or in U.S. Pat. No. 3,394,164; polyisocyanates containing acylated urea groups according to German Pat. No. 1,230,778; polyisocyanates containing biuret groups as described, e.g. in German Pat. No. 1,101,394 (U.S. pat. Nos. 3,124,605 and 3,201,372) and in British Pat. No. 889,050; polyisocyanates prepared by telomerization reactions as described, e.g. in U.S. Pat. No. 3,654,106; polyisocyanates containing ester groups as mentioned, for example, in British Pat. Nos. 965,474 and 1,072,956, in U.S. Pat. No. 3,567,763 and in German Pat. No. 1,231,688; reaction products of the above-mentioned isocyanates with acetals according to German Pat. No. 1,072,385; and polyisocyanates containing polymeric fatty acid groups according to U.S. Pat. No. 3,455,883.

The distillation residues obtained from the commercial production of isocyanates which still contain isocyanate groups may also be used, optionally dissolved in one or more of the above-mentioned polyisocyanates. Mixtures of the above-mentioned polyisocyanates may also be used.

The commercially readily available polyisocyanates are generally preferred. These include, for example, tolylene2,4- and -2,6-diisocyanate and mixtures of these isomers ("TDI"); polyphenylpolymethylene polyisocyanates, which may be obtained by aniline/formaldehyde condensation followed by phosgenation ("crude MDI"); and polyisocyanates containing carbodiimide groups, urethane groups, allophanate groups, isocyanurate groups, urea groups or biuret groups ("modified polyisocyanates⇌").

The amount of isocyanate used in a given formulation is dependent on the amount of water in the formulation as well as the choice of polyols and isocyanates and the index used to process the foam. All of this is well understood in the art and requires no undo experimentation to understand and use Applicants' invention.

The starting components used for the production of isocyanate polyaddition resins with the aid of the novel catalyst systems according to the present invention also include compounds which contain at least two hydrogen atoms capable of reacting with isocyanates and which generally have a molecular weight of from about 400 to about 10,000. These may be compounds containing amino groups, thiol groups or carboxyl groups, but are preferably polyhydroxyl compounds, and in particular compounds having from 2 to 8 hydroxyl groups and especially those having a molecular weight of from 800 to 10,000 and preferably from 1000 to 7000. These include, for example, polyesters, polyethers, polythioethers, polyacetals, polycarbonates and polyester amides containing at least 2, generally from 2 to 8 and preferably from 2 to 4 hydroxyl groups, such as those known for the production of both homogeneous and cellular polyurethanes.

The hydroxyl group-containing polyesters used may be, for example, reaction products of polyhydric, preferably dihydric alcohols, optionally with the addition of trihydric alcohols, and polybasic, preferably dibasic carboxylic acids. Instead of using the free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. with halogen atoms, and/or be unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethyltere phthalate and terephthalic acid-bis-glycol esters. Suitable polyhydric alcohols include, e.g. ethylene glycol; propylene glycol-(1,2) and -(1,3); butylene glycol(1,4) and -(2,3); hexanediol (1,6); octanediol-(1,8); neopentyl glycol; cyclohexane dimethanol (1,4-bishydroxymethylcyclohexane); 2-methyl-1,3-propanediol; glycerol; trimethylolpropane; hexanetriol-(1,2,6); butanetriol-(1,2,4); trimethylolethane; pentaerythritol; guinitol; mannitol and sorbitol; methylglycoside; diethylene glycol; trethylene glycol; tetraethylene glycol; polyethylene glycols; dipropylene glycol; polypropylene glycols; dibutylene glycol and polybutylene glycols. The polyesters may also contain carboxyl end groups. Polyesters of lactones, such as e-caprolactone, and hydroxycarboxylic acids, such as w-hydroxycaproic acid, may also be used.

The polyethers used according to the present invention which contain at least 2, generally from 2 to 8 and preferably 2 or 3 hydroxyl groups are known. They may be prepared, for example, by the polymerization of epoxides, such as ethylene oxide, propylene oxide, butylene oxide, tetrahydrofuran, styrene oxide or epichlorohydrin, either each on its own, (e.g. in the presence of BF3), or by chemical addition of these epoxides, optionally as mixtures or successively, to starting components having reactive hydrogen atoms, such as water, alcohols or amines, e.g. ethylene glycol,,propylene glycol-(1,3) or - 1,2), trimethylol propane, 4,4 dihydroxydiphenylpropane, aniline, ammonia, ethanolamine or ethylenediamine. Sucrose polyethers which have been described, for example in German Auslegeschriften Nos. 1,176,358 and 1,064,938 may also be used according to the present invention. It is frequently preferred to use polyethers which contain predominantly primary OH groups (up to 90%, by weight, based on all the OH groups present in the polyether. Polyethers which have been modified with vinyl polymers, for example the compounds obtained by the polymerization of styrene and acrylonitrile in the presence of polyethers (U.S. Pat. Nos. 3,383,351; 3,304,273; 3,523,093 and 3,110,695 and German Pat. No. 1,152,536) are also suitable. Polybutadienes containing OH groups may also be used.

Among the polythioethers which should be particularly mentioned are the condensation products obtained from thiodiglycol on its own and/or with other glycols, dicarboxylic acids, formaldehyde, aminocarboxylic acids or amino alcohols. The products obtained are polythio mixed ethers, polythio ether esters or polythioether ester amides, depending on the co-components.

Suitable polyacetals include, e.g. the compounds which may be obtained from glycols,, such as diethylene glycol, triethylene glycol, 4,4 -dioxethoxydiphenyldimethylmethane or hexanediol, and formaldehyde. Polyacetals suitable for the purpose of the present invention may also be prepared by polymerizing cyclic acetals.

Suitable polycarbonates containing hydroxyl groups are known and may be prepared, for example, by the reaction of diols, such as propanediol-(1,3), butanediol-(1,4) and/or hexanediol-(1,6), diethylene glycol, triethylene glycol or tetraethyleneglycol, with diarylcarbonates, e.g. diphenyl carbonate, or phosgene.

Suitable polyester amides and polyamides include, e.g. the predominantly linear condensates obtainable from polybasic saturated and unsaturated carboxylic acids or their anhydrides and polyvalent saturated and unsaturated amino alcohols, diamines, polyamines or mixtures thereof.

Polyhydroxyl compounds already containing urethane or urea groups as well as modified or unmodified natural polyols, such as castor oil, carbohydrates or starch may also be used. Additionally, products of alkylene oxides and phenol/formaldehyde resins or of alkylene oxides and urea/formaldehyde resins are also suitable according to the present invention.

Representatives of these compounds which may be used according to the present invention have been described, e.g. in High Polymers, Vol. XVI, "Polyurethanes, Chemistry and Technology:, by Saunders-Frisch, Interscience Publishers, New York, London, Volume I, 1962, pages 32–42 and pages 4454 and Volume II, 1964, pages 5–6 and 198–199 and in Kunststoff-Handbuch, Volume VII, Vieweg-Hochtlen, Carl-Hanser-Verlag, Munich, 1966, e.g. on pages 45 to 71.

Mixtures of the above-mentioned compounds containing at least two hydrogen atoms capable of reaction with isocyanates and having a molecular weight of from about 400 to about 10,000 may, of course, also be used, e.g. mixtures of polyethers and polyesters.

The starting components used according to the present invention optionally also include compounds having a molecular weight of from 32 to about 400 which contain at least two hydrogen atoms capable of reacting with isocyanates. These are also compounds containing hydroxyl groups and/or amino groups and/or thiol groups and/or carboxyl groups, preferably compounds containing hydroxyl groups and/or amino groups. They serve as chain lengthening agents or cross-linking agents. They generally contain from 2 to 8 hydrogen atoms capable of reacting with isocyanates, preferably 2 or 3 such hydrogen atoms. The following are mentioned as examples of such compounds; ethylene glycol; propylene glycol-(1,2) and -(1,3); butylene glycol-(1,4) and -(2,3); pentanediol-(1,5); hexanediol-(1,6); octanediol-(1,8); neopentylglycol; 1,4-bis-hydroxymethylcyclohexane; 2-methyl-1,3-propanediol; glycerol; trimethylolpropane; hexanetriol-(1,2,6); trimethylolethane; pentaerythritol; quinitol; mannitol and sorbitol; diethylene glycol; triethylene glycol; tetraethylene glycol; polyethylene glycols having a molecular weight of up to 400; dipropylene glycol, polypropylene glycols having a molecular weight of up to 400; dibutylene glycol; polybuty,lene glycols having a molecular weight of up to 400; 4,4 -dihydroxydiphenylpropane; dihydroxymethylhydroquinone; ethanolamine; diethanolamine; triethanolamine; 3-aminopropanol; ethylenediamine; 1,3-diaminopropane; 1-mercapto-3aminopropane; 4-hydroxyphthalic acid or 4-aminophthalic, acid; succinic acid; adipic, acid; hydrazine; N,N dimethylhydrazine and 4,4 -diaminodiphenylmethane.

Here again, mixtures of various compounds having a molecular weight of from 32 to 400 and containing at least two hydrogen atoms capable of reacting with isocyanate may be used.

Production of the isocyanate polyaddition resins with the aid of the novel catalyst systems according to the present invention is frequently carried out with the use of water and/or readily volatile organic substances as blowing agents. Suitable organic blowing agents include, e.g. acetone; ethyl acetate; halogenated alkanes, such as methylene chloride, chloroform, ethylidene chloride, vinylidene chloride, monofluorotrichloromethane, chlorodifluoromethane or dichlorodifluoromethane, butane; hexane; heptane or diethylether. The effect of a blowing agent may also be obtained by adding compounds which decompose at temperatures above room temperature to liberate gases, such as nitrogen, e.g. azo compounds, such as azoisobutyric acid nitrile. Other examples of blowing agents and details about the use of blowing agents may be found in Kunststoff-Handbuch, Volume VII, published by Vieweg and Hochtlen, Carl-Hanser-Verlag, Munich, 1966, e.g. on pages 108 and 109, 453 to 455 and 507 to 510.

Other known catalysts may, of course, be used in addition to the catalyst combinations according to the present invention, particularly if particular effects may hereby be obtained.

Silaamines having carbon-silicon bonds as described, e.g. U.S. Pat. No. 3,620,984 may also be used as additional catalysts, for example, 2,2,4-trimethyl-2-silamorpholine and 1,3-diethylaminomethyltetramethyldisiloxane. Production of the polyurethane resins with the aid of the new catalyst combinations according to the present invention may also be carried out with the addition of surface active agents (emulsifiers and/or foam stabilizers).

Suitable emulsifiers include, e.g., the sodium salts of ricinoleic sulphonates or salts of fatty acids and amines, such as oleic acid diethylamine or stearic acid diethanolamine. Alkali metal or ammonium salts of sulphonic acids, such as dodecylbenzene sulphonic acid or dinaphthylmethane disulphonic acid, or of fatty acids, such as ricinoleic acid, or of polymeric fatty acids may also be used as surface active additives.

The foam stabilizers used are mainly polyether siloxanes, especially those which are water-soluble. These compounds generally have a polydimethylsiloxane group attached to a copolymer of ethylene oxide and propylene oxide. Foam stabilizers of this type have been described, for example, in U.S. Pat. Nos. 2,834,748; 2,197,480 and 3,629,308.

According to the present invention reaction retarders may also be added e.g. compounds which are acid in reaction, such as hydrochloric acid or organic acid halides. Known cell regulators, such as paraffins or fatty alcohols or dimethylpolysiloxanes; pigments; dyes; known flame retarding agents, such as trischloroethylphosphate, tricresylphosphate or ammonium phosphate or polyphosphate; stabilizers against aging and weathering; plasticizers; fungistatic and bacteriostatic substances; and fillers, such as barium sulphate, kieselguhr; carbon black or whiting may also be used.

Other examples of surface active additives, foam stabilizers, cell regulators, reaction retarders, stabilizers, flame retarding substances, plasticizers, dyes, fillers and fungistatic and bacteriostatic substances which may also be used according to the present invention and details concerning the use and action of these additives may be found in Kunststoff-Handbuch, Volume VII, published by Vieweg and Hochtlen, Carl-Hanser-Verlag, Munich, 1966, e.g. on pages 103 to 113.

The various amounts of materials, aside from the catalyst system itself, is dependent upon the ultimate product desired, and may, accordingly, be varied widely in manners know and used in the art.

According to the present invention, the components are reacted together by the known one-shot process, in many cases using mechanical devices, such as those described in U.S. Pat. No. 2,764,565. Details about processing apparatus which may also be used according to the present invention may be found in Kunststoff Handbuch, Volume VII, published by Vieweg and Hochtlen, Carl-Hanser-Verlag, Munich, 1966, e.g. on pages 121 to 205. As is known in the art, in a one-shot process, either all the components (both reactive and non-reactive) are mixed at one time, or the non-isocyanate reactive components are first mixed with the active hydrogen containing materials and the resultant pre-mix is then mixed with the isocyanate component.

For producing foams according to the present invention, the foaming reaction may be carried out inside molds. The reaction mixture is introduced into a mold made of a metal, such as aluminum, or of a synthetic material, such as an epoxide resin. The reaction mixture foams inside the mold to form the shaped product. This process of foaming in molds may be carried out to produce a product having a cellular structure on its surface or it may be carried out to produce a product having a non-cellular skin and cellular center. According to the present invention, the desired result may be obtained by either introducing just sufficient foamable reaction mixture into the molds to fill the mold with foam after the reaction or introducing a larger quantity of foamable reaction mixture, in which case the process is said to be carried out under conditions of overcharging, a procedure which has already been disclosed, for example, in U.S. Pat. Nos. 1,178,490 and 3 182,104.

When foaming is carried out in molds, so-called "external mold release agents" such as silicone oils, are frequently used, but so-called "internal mold release agents" may also be used, optionally in combination with external mold release agents, for example those disclosed in German Offenlegungsschriften Nos. 2,121,670 and 2,307,589.

Cold setting foams may also be produced according to the present invention (see British Pat. No. 1,162,517, German Offenlegungsschrift No. 2,153,086).

On the other hand, foams may, of course, be produced by the process of block foaming or by the known laminator process.

The following Examples serve to illustrate the invention. The figures quoted represent parts by weight or percentages by weight unless otherwise indicated.

EXAMPLE I

Isocyanate

| | |
|---|---|
| Lupranate ® M20S Polymeric MDI | 55.0% |
| Lupranate ® MS Pure MDI | 25.0% |
| Lupranate ® MI Pure MDI | 20.0% |
| | 100.0% |

Free NCO = 32.4%

Resin

| | |
|---|---|
| WUC-32380-R a resin blend available from BASF Corp. | 98.9% |
| Catalyst* | 1.10% |
| | 100.00% |

*The particular catalyst for each sample is given in Table.

Using this combination of resin and isocyanate and using conventional polyurethane production processes, foam blocks measuring 12"×12"×1" were molded to a density of 5.5 to 6.0 pounds per cubic foot. These molded foams were demolded to 5 minutes after being poured. Within one hour of demolding, the blocks were diced into small pieces (approx. 1"×1" in size). 100 grams of the diced foam of each sample was placed in separate 2-quart mason jars. A piece of injection molded Lexan ® 141 polycarbonate, available from General Electric, having approximate dimension of 2"L×1" W×¼" H was placed in each jar and the jars were sealed. The jars were placed in a convection oven at 180° F. until failure of the polycarbonate was observed.

Failure of the polycarbonate was defined as, a change in the appearance of the surface of the polycarbonate. The most common failure involved the surface of the polycarbonate becoming glossy, with the formation of small droplets also occurring. Another type of failure observed was the whitening of the surface of the polycarbonate. In all cases, the strength of the polycarbonate was lowered.

For each sample, the time from start of oven heating until the polycarbonate failed was recorded. The results are shown in Table I.

The results clearly show that the samples (1–9) using reactive amine catalysts in the absence of non-reactive amine catalysts have superior compatibility with polycarbonate inserts over those using only non-reactive amine catalysts (samples 10–17).

EXAMPLE II

Using the same isocyanate and resin and following the same procedure as in Example I, the following eight samples were produced and tested as per Example I to show the advantageous effect of amine scavengers with non-reactive amines. These results clearly illustrate the advantageous effects of using amine scavengers in conjunction with non-reactive amines. In reactive amine systems some additional positive effect is also realized using the amine scavengers in Samples 2-3 but a determental effect occurred in Example 4. No such corresponding determental effect was found with this amine scavenger and non-reactive amines.

TABLE I

| | | | | | | | | |
|---|---|---|---|---|---|---|---|---|
| ZF-10 | 0.4 | 0.4 | 0.4 | — | — | — | — | — |
| ZR-70 | 0.7 | — | — | — | — | 0.7 | 0.7 | — | — |

TABLE I-continued

| | | | | | | | | | | | | | | | | |
|---|---|---|---|---|---|---|---|---|---|---|---|---|---|---|---|---|
| PC-17 | — | 0.7 | — | — | 0.7 | — | — | 0.7 | — | | | | | | | |
| PC-15 | — | — | 0.7 | 0.7 | — | — | — | — | 0.7 | | | | | | | |
| DMEA | — | — | — | 0.4 | 0.4 | 0.4 | — | — | — | | | | | | | |
| Dabco T | — | — | — | — | — | — | 0.4 | 0.4 | 0.4 | | | | | | | |
| A-1 | | | | | | | | | | 0.4 | 0.4 | 0.4 | 0.4 | 0.4 | — | — | — |
| 33LV | | | | | | | | | | 0.7 | — | — | — | — | — | — | — |
| PC-8 | | | | | | | | | | — | 0.7 | — | — | — | — | — | 0.7 |
| DMP | | | | | | | | | | — | — | 0.7 | — | — | — | — | — |
| XDM | | | | | | | | | | — | — | — | 0.7 | — | — | 0.7 | — |
| TEA | | | | | | | | | | — | — | — | — | — | 0.4 | 0.4 | 0.4 |
| PC-9 | | | | | | | | | | — | — | — | — | 0.7 | 0.7 | — | — |
| Index | 95 | → | → | → | → | → | → | → | → | → | → | → | → | → | → | → | → |
| Time to Fail | | | | | | | | | | | | | | | | | |
| Days | 5 | 5 | 6 | 10 | 5 | 5 | 5 | 5 | 5 | 0 | 2 | 2 | 2 | 2 | 2 | 2 | 2 |
| Hours | 17 | 0 | 16 | 16 | 0 | 17 | 17 | 0 | 17 | 14 | 23 | 6 | 6 | 3 | 18 | 6 | 6 |

TABLE II
REACTIVE CATALYSTS vs NON-REACTIVE CATALYSTS IN THE PRESENCE OF AMINE SCAVENGERS

| | 1 | 2 | 3 | 4 | 5 | 6 | 7 | 8 |
|---|---|---|---|---|---|---|---|---|
| ZF-10 | 0.4 | 0.4 | 0.4 | 0.4 | — | — | — | — |
| ZR-70 | 0.7 | 0.7 | 0.7 | 0.7 | — | — | — | — |
| A-1 | — | — | — | — | 0.4 | 0.4 | 0.4 | — |
| POLYCAT 9 | — | — | — | — | 0.7 | 0.7 | 0.7 | 0.7 |
| FRYOL CEF | — | 2.9 | — | — | — | — | — | 2.9 |
| FRYOL DMMP | — | — | 2.9 | — | — | — | 2.9 | — |
| THERMOLIN 101 | — | — | — | 2.9 | — | 2.9 | — | — |
| TOTAL PBW IN RESIN BLEND | 100 | 102.9 | → | → | 100 | 10.29 | → | → |
| INDEX | 100 | → | → | → | → | → | → | → |
| DAYS TO FAILURE | 12 | 15 | 19 | 6 | 11 | 21 | 21 | 15 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A molded flexible polyurethane foam article having a structural support attached thereto or incorporated within comprising:
   (a) a structural support comprised of a polycarbonate; and
   (b) a flexible polyurethane forming foam composition, comprised of,
      (i) an organic isocyanate,
      (ii) a polyol, and
      (iii) a reactive essentially linear tertiary amine catalyst containing at least one active hydrogen and/or hydroxyl group,
   wherein said flexible polyurethane forming composition (b) when used in a molded flexible polyurethane article having a structural support (a) attached thereto, exhibits improved polycarbonate compatibility.

2. An article as claimed in claim 1 containing forming composition as claimed in claim 1; wherein said composition also contains one or more of emulsifiers, foam stabilizers, retarders, cell regulators, pigments, dyes, flame retardants, stabilizers against aging and weathering, plasticizers, fungistatic substances, bacteriostatic substances, fillers, carbon black and whiting.

3. An article as claimed in claim 1; wherein the ratio of organic polyisocyanate to polyol is 80 percent to 120 percent of the stoichiometrically required amount.

4. An article as claimed in claim 1; wherein said reactive tertiary amine catalyst is used in an amount of from 0.1 weight percent to about 2.8 weight percent of the total urethane composition.

5. An article as claimed in claim 1; wherein said organic polyisocyanate comprises; from about 15 weight percent to about 70 weight percent, said polyol comprises from about 30 weight percent to about 85 weight percent and, said reactive tertiary amine catalyst is present in an amount of from about 0.1 weight percent to about 2.8 weight percent.

6. A molded flexible polyurethane composition having an improved polycarbonate compatibility comprising:
   (a) an organic polyisocyanate,
   (b) a polyol
   (c) a non-reactive tertiary amine catalyst, and
   (d) an effective amount of a composition which acts as an amine scavenger.

7. A molded flexible polyurethane composition as claimed in claim 6, wherein said composition also contains one or more of emulsifiers, foam stabilizers, retarders, cell regulators, pigments, dyes, flame retardants, stabilizers against aging and weathering, plasticizers, fungistatic substances, bacteriostatic substances, fillers, carbon black and whiting.

8. A molded flexible polyurethane composition as claimed in claim 6; wherein the ratio of organic polyisocyanate to polyol is 80 percent to 120 percent of the stoichiometrically required amount.

9. A molded flexible polyurethane composition as claimed in claim 6; wherein said non-reactive tertiary amine is present in an amount of from about 0.1 weight percent to about 2.8 weight percent and said amine scavenger is present in an amount of from 0.5 weight percent to about 5.0 weight percent.

10. A molded flexible polyurethane composition having an improved polycarbonate compatibility comprising:
    (a) an organic polyisocyanate,
    (b) a polyol,
    (c) a blend of reactive and non-reactive tertiary amine catalysts, and
    (d) an effective amount of a composition which acts as an amine scavenger.

11. A molded flexible polyurethane composition as claimed in claim 10, wherein said composition also contains one or more of emulsifiers, foam stabilizers, retarders, cell regulators, pigments, dyes, flame retardants, stabilizers against aging and weathering, plasticizers, fungistatic substances, bacteriostatic substances, fillers, carbon black and whiting.

12. A molded flexible polyurethane composition as claimed in claim 10; wherein the ratio of organic polyisocyanate to polyol is 80 percent to 120 percent of the stoichiometrically required amount.

13. A molded flexible polyurethane composition as claimed in claim 10; wherein said non-reactive tertiary amine is present in an amount of from about 0.1 weight percent to about 2.8 weight percent and said amine scavenger is present in an amount of from 0.5 weight percent to about 5.0 weight percent.

14. An article as claimed in claim 1; wherin said organic polyisocyanate comprises, from about 15 weight percent to about 70 weight percent, said polyol comprises from about 30 weight percent to about 85 weight percent said non-reactive tertiary amine catalyst comprises from about 0.1 weight percent to about 2.8 weight percent, and said effective amount of said amine scavenger is present in an amount of from about 0.5 weight percent to about 5.0 weight percent.

15. A process for producing a molded flexible polyurethane composition having an improved polycarbonate insert compatibility comprising; reacting an isocyanate and a polyol in the presence of a non-reactive tertiary amine catalyst and an amine scavenger composition in a mold, thereby producing said polycarbonate insert compatibility improved molded flexible polyurethane composition.

* * * * *